United States Patent [19]

Pow

[11] Patent Number: 4,647,255
[45] Date of Patent: Mar. 3, 1987

[54] PIPE BEND RESTRICTOR

[75] Inventor: Eric G. Pow, Vancouver, Canada

[73] Assignee: Novacorp International Consulting Ltd., Canada

[21] Appl. No.: 588,774

[22] Filed: Mar. 12, 1984

[30] Foreign Application Priority Data

Jan. 9, 1984 [CA] Canada ................... 444904

[51] Int. Cl.⁴ .......................... F16L 1/04; B21D 9/00
[52] U.S. Cl. ........................................ 405/168; 72/369
[58] Field of Search .............. 405/158, 168, 171, 172, 405/195; 138/110, 172; 72/367, 369

[56] References Cited

U.S. PATENT DOCUMENTS

| 1,560,789 | 11/1925 | Johnson et al. | 138/110 X |
| 1,677,077 | 7/1928 | Fortune | 138/110 X |
| 3,434,296 | 3/1969 | Otteman et al. | |
| 3,473,361 | 10/1969 | Cwik | 72/369 X |
| 3,595,312 | 7/1971 | Matthews | |
| 3,754,404 | 8/1973 | Moore | |
| 3,911,689 | 10/1975 | Hogan | |
| 4,148,127 | 4/1979 | Somerville | 405/168 X |
| 4,340,322 | 7/1982 | Springett et al. | |

Primary Examiner—David H. Corbin
Attorney, Agent, or Firm—Stevens, Davis, Miller & Mosher

[57] ABSTRACT

A pipe bend restrictor for controlling the intentional deformation of a pipe to form a bend. The apparatus includes a bullnose for connection to the end of the pipe and a plurality of support washers and a backup ring mounted behind the bullnose and along the length of the pipe being bent. A protection sleeve is positioned over the pipe surface to interface between it and the washers. A specific washer configuration ensures that the washer supporting any given section of pipe pivots about an axis that passes through the axis of the pipe, as near as possible to the section of pipe which it supports.

3 Claims, 6 Drawing Figures

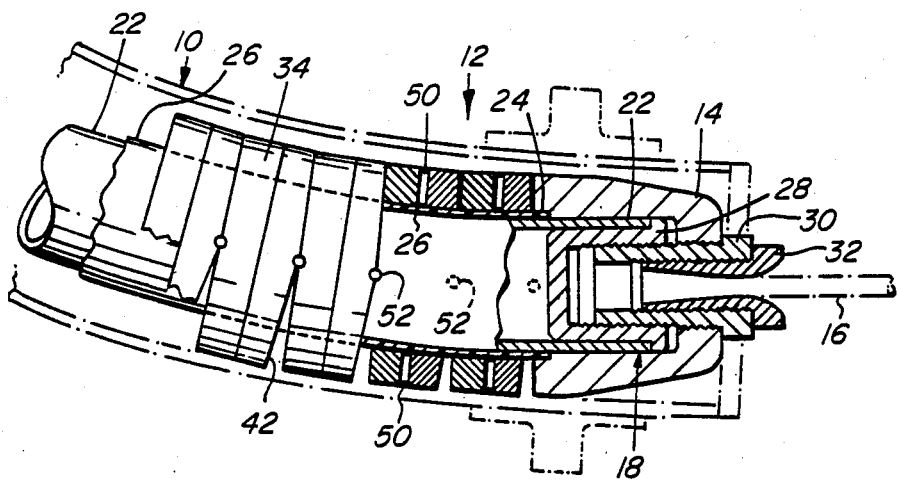
FIG. 1
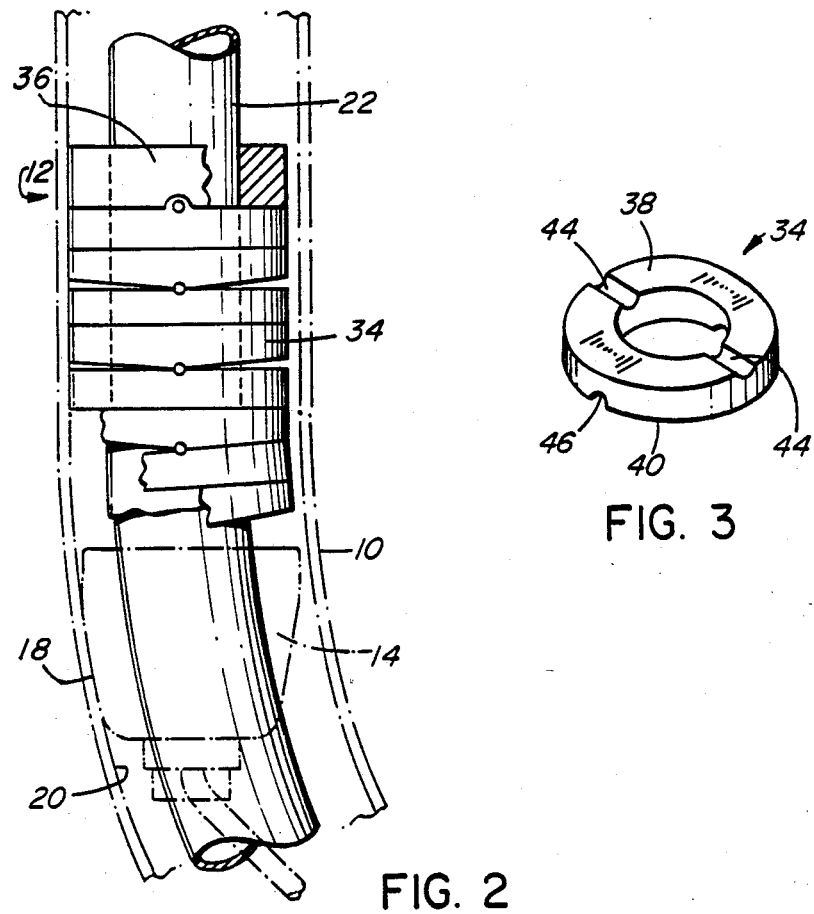
FIG. 2
FIG. 3

PIPE BEND RESTRICTOR

FIELD OF THE INVENTION

This application relates to a device for controlling the intentional deformation of a pipe to form a bend therein and is applicable where ever one pipe is to be inserted into an existing bent pipe by pulling it in from one end. The invention is particularly adaptable to situations where a bend must be formed in a pipe at a remote location where an existing or outside pipe could be located underground, subsea, pre-installed in a process plant or the like.

BACKGROUND OF THE INVENTION

Changing the direction of a pipeline from essentially horizontal to essentially vertical is a common problem in many areas, one such area being the offshore oil industry where a pipeline running horizontally along the ocean floor must be directed to an essentially vertical orientation so as to connect with some surface facility such as a drilling or production platform. These pipelines usually carry hydrocarbons under pressure and it is therefore desirable to have a continuous pipe to avoid problems associated with subsea connections. Techniques currently known to the industry to perform such connections include the "Bending Shoe Method"; the "Open J-Tube Pull"; the "J-Tube Method"; and the "Reverse J-Tube Method".

The "Bending Shoe Method" of installation involves the positioning of the pipeline on the sea bed and extending it past the platform. The free end of the pipeline is then pulled by a winch on the platform against a "bending shoe" a support of fixed radius near the base of the platform, until the pipeline is bent into a vertical position.

A variation of the bending shoe method involves pulling the pipe past and against the bending shoe to the surface. This is sometimes referred to as an open J-tube pull. The J-tube pull method involves connecting a cable threaded through a preinstalled J-tube from the platform to a pull head on the leading end of the pipe. The cable is connected to a surface crane or pulling winch mounted on the platform. The pipeline is then pulled through the J-tube to the surface.

In the reverse J-tube method, the pipe is initiated at the platform deck and lowered through the J-tube. The pipe is held in position and fed into the J-tube by a gripper machine on the platform deck. If a downward pulling force is needed on the pipe, a cable may extend from the pull head on the pipe, down through the J-tube to exit at the bottom thereof and connect to a pulling winch at the surface. The pull force may be provided by a derrick or a pipe lay barge or by another pulling arrangement.

In all of the above mentioned known methods, the radius of curvature of the bending shoe or J-tube is kept large, relative to the diameter of the pipe being bent, in order to keep deformation of the pipe low, typically 2% permanent strain or less. This results in a large cumbersome J-tubes and bending shoes particularly as the pipe diameter increases. The use of the present invention allows the use of J-tubes of smaller radius of curvature while maintaining the intregrity of pipe installed through one such J-tube.

SUMMARY OF THE INVENTION

A pipe-bend restrictor according to the present invention preforms several functions. One such function is to control the deformation of the pipe as the bend is formed in order to limit the amount of bending at any one cross section to some predetermined, acceptable amount. Another function is to support the cross section of the pipe at the point of deformation to keep the pipe from ovalling. A still further function is to protect the surface of the pipe from gouging, which could cause stress cocentration during service. It will be appreciated that these functions are required of any pipe bending system and as such the scope of usage of the present invention, while being described in this application in relation to the offshore oil industry, is not limited either to the oil industry or to the offshore industry.

The pipe bend restrictor assembly according to the invention is intended for use in installing a riser pipe in an existing J-tube, using the reverse J-tube method described above. However, the effectiveness of the invention is not restricted to such applications.

The bend restrictor assembly consists of a bullnose, support washers with rollers, a backup ring and an internal protection sleeve. The bullnose is fixed to the lower end of the riser pipe and among other things, serves to hold the washers in a fixed position along the axis of the riser. The backup ring is fastened to the riser at the other end of the assembly.

According to a broad aspect, the invention relates to an assembly for controlling the intentional deformation of a pipe when forming a bend therein, said assembly being mounted on the exterior of said pipe and comprising a bullnose secured to the lower terminal end of the pipe, a sleeve of low friction material positioned over the surface of the pipe in the bend area, a plurality of support washers mounted along the bend area of the pipe, over the sleeve and behind said bullnose; and a backup ring at the other end of the assembly secured to the pipe; each of said washers having a flat face and a peaked face, a cylindrical groove in each of said faces and being positioned at 90° with respect to the groove in the other face; and rollers located in each groove of each washer.

The invention is illustrated by way of example in the accompanying drawings in which:

FIG. 1 is an elevation view, partly in section, showing the lower end of a riser pipe fitted with the bend restrictor assembly;

FIG. 2 is a view similar to FIG. 1 but showing the other end of the restrictor assembly on the riser pipe;

FIG. 3 is a perspective view of one of the support washers;

DESCRIPTION OF THE PREFERRED EMBODIMENT

Figure 4:
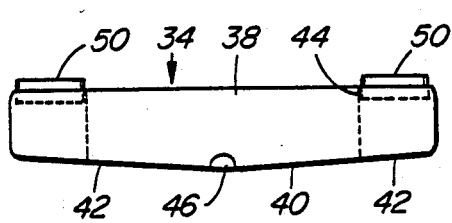
FIG. 4 is an elevation view of one of the support washers.

Referring to FIGS. 1 and 2, an existing pipe line riser on J-tube 10 of say 12 inch diameter is illustrated with the pipe bend restrictor assembly shown in generally at 12 being positioned therein. FIG. 1 shows the lower end of the existing J-tube with the leading end of the assembly therein and FIG. 2 illustrates the other end of the assembly at the top end of the bend. FIG. 2 also illustrates the position of the bullnose 14 when the assembly is being lowered down through the J-tube and possibly drawn therethrough by means of an optional pull-in cable 16.

The bullnose 14 provides several functions for the assembly 12. Initially, it presents a volume of revolution, the shape of which is governed by the internal surface of the J-tube bend such that line contact occurs between the cone surface 18 of the bullnose and the inner surface 20 of the J-tube as shown in FIG. 2, thereby minimizing contact stresses. The bullnose also serves as a pulling point to form the bend as described above should this feature be desired. Lastly, it constitutes one end of the bend restrictor assembly 12 as shown clearly in FIG. 2. The bullnose 14 is secured to the exterior of the lower terminal end of the riser pipe 22 and it has a peripheral groove 24 to receive one end of the protection sleeve 26 of low friction material such as Teflon. The bullnose encloses an outer bushing 28 which is welded to the inner terminal end of the riser pipe 22 and which in turn has an inner bushing 30 threadably located therein. If necessary, the pull-in cable 16 can be located in the inner bushing through the provision of a button stop 32 having a frustoconical inner end to receive the inner terminal end of the cable 16 which is similarly configured.

Mounted on the exterior of the protection sleeve 26 are a series of support washers 34 and the assembly is completed by the backup ring 36 secured by welding to the riser pipe 22 as shown in FIG. 2. The backup ring, in addition to constituting the upper or trailing end of the assembly 12, also provides a contact point between the upper end of the assembly and the J-tube 10.

The low friction protection sleeve 26 minimizes the friction between the interior surface of the support washers 34 and the exterior surface of the riser pipe 22 so that, at the point of bending, the washers and the pipe surface can move relative to one another and avoid concentrated, localized deformation. In addition, the sleeve 26 provides transition between the continuous bent pipe 22 and the discontinuous inner surface of the bend restrictor assembly 12.

Figure 5:
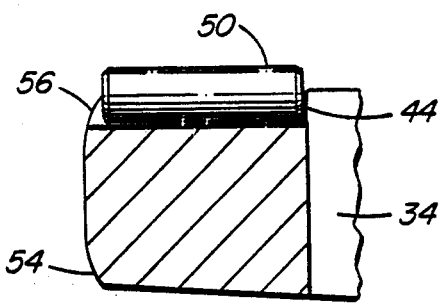
FIG. 5 is an enlarged, fragmentary view of one peripheral section of the washer in FIG. 4.
Figure 6:
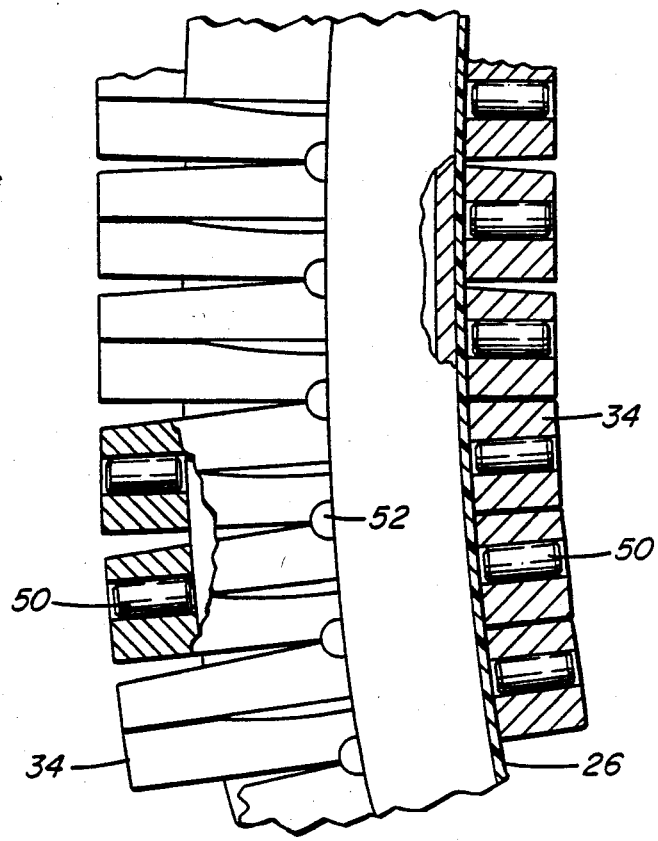
FIG. 6 is an elevational view, partially in section, of a section of the riser pipe showing the operation of the elements of the assembly.

Referring to FIGS. 3, 4 and 5, each of the support washers 34 has one flat face 38 and one peaked face 40 as shown clearly in FIG. 4. The angle formed between either of the flats 42 of the peaked face 40 is dictated by the curvature required in the pipe 22. It will be noted that there is a cylindrical groove 44 in the flat face 38 and cylindrical groove 46 on the peaked face 40, where the axis of the groove 46 coincides with the apex of the peak. On the flat face 38, the axis of the groove lies in the plane of the face and is oriented at 90° from the groove 46 in the peaked face 40. As shown clearly in FIGS. 2 and 6, the washers 34 are stacked along the riser pipe 22 over the sleeve 26 so that the axis of each roller pair 50 is at 90° to the roller pair 52 in the adjacent washer 34. As shown in FIG. 6, the rollers 52 whose axes are normal to the drawing Figure are accommodating all the bending. Generally speaking, the bend will in some plane contain the axes of neither set of rollers and both set will accommodate other bending.

FIG. 5 shows the precise location of the rollers 50 which may be secured in the grooves with epoxy, the peripheral edges of the washer 34 being rounded at 54 and 56.

A fundamental feature of the restrictor assembly 12 is that the washer 34 supporting any given section of pipe 22 pivots about an axis which passes through the axis of the pipe, as near as possible to the section of pipe which it supports. This allows the neutral axis of the bend restrictor 12 to coincide with the center line of the pipe 22 and thereby insures the neutral axis of the bend will be in the center line of the pipe. This configuration minimizes the maximum deformation required in the pipe wall to make the bend.

While the present invention has been described in connection with the specific embodiment thereof and in a specific use, various modifications of the invention will occur to those skilled in the art without departing from the spirit and scope of the invention as set forth in the appended claims.

The terms and expressions which have been employed in this specification are used as terms of description and not of limitation. There is no intention in the use of such terms and expressions to exclude any equivalence of the features shown and described or portions thereof. It is recognized that various modifications are possible within the scope of the invention as claimed.

The embodiments of the invention in which an exclusive property or privilege is claimed are defined as follows:

1. An assembly for controlling the intentional deformation of a pipe when forming a bend therein as close to the neutral axis of said pipe as possible, said assembly being mounted on the exterior of said pipe and comprising:
    a bullnose leading member of frusto-conical configuration secured to the lower terminal end of said pipe;
    a layer of low friction material positioned over the surface of said pipe in the bend area thereof;
    a plurality of support washers, in contact with one another, mounted behind said bullnose leading member and along said bend area of said pipe to provide continuous, 360 degree support to said bend area thereof;
    and a backup ring at the other end of said assembly in contact with the last washer of said assembly and being secured to said pipe;
    each of said washers having a flat face and an opposite, peaked face, a semi-cylindrical groove in each face and being positioned at 90 degrees with respect to the groove in the opposite face, and a roller located in each groove of each said washer;
    the angle formed between either of said flats of the peaked face and the flat of said support washers being dictated by the pipe curvature desired so that the geometry of said pipe bend is controlled by the configuration of said support washers.

2. An assembly according to claim 1 wherein the forming of the bend is performed subsea at the bottom end of a riser guide tube.

3. An assembly according to claim 1 wherein the sleeve of low friction material is Teflon.

* * * * *